(12) United States Patent
Borhan et al.

(10) Patent No.: US 12,515,659 B2
(45) Date of Patent: Jan. 6, 2026

(54) COOPERATIVE ADAPTIVE CRUISE CONTROL FOR ELECTRIFIED POWERTRAIN VEHICLES

(71) Applicant: Cummins Inc., Columbus, IN (US)

(72) Inventors: Hoseinali Borhan, Bloomington, IN (US); Timothy R. Frazier, Columbus, IN (US)

(73) Assignee: Cummins Inc., Columbus, IN (US)

(*) Notice: Subject to any disclaimer, the term of this patent is extended or adjusted under 35 U.S.C. 154(b) by 241 days.

(21) Appl. No.: 18/325,203

(22) Filed: May 30, 2023

(65) Prior Publication Data

US 2023/0382379 A1    Nov. 30, 2023

Related U.S. Application Data

(60) Provisional application No. 63/365,556, filed on May 31, 2022.

(51) Int. Cl.
*B60W 30/16* (2020.01)
*B60L 7/18* (2006.01)
*B60W 30/18* (2012.01)

(52) U.S. Cl.
CPC .............. *B60W 30/16* (2013.01); *B60L 7/18* (2013.01); *B60W 30/18127* (2013.01);
(Continued)

(58) Field of Classification Search
CPC ........... B60W 30/16; B60W 30/18127; B60W 30/18136; B60W 2710/18; B60W 2720/10; B60W 2754/30; B60W 2552/15; B60W 2552/30; B60W 2555/20; B60W 2556/65; B60L 7/18; B60L 7/26; B60L 58/13; B60L 58/16; B60L 2240/12; B60L 2240/642; B60L 2240/645; B60L 2240/667; B60L 2240/68; G08G 1/22
See application file for complete search history.

(56) References Cited

U.S. PATENT DOCUMENTS 9,637,125 B2   5/2017 Dextreit et al.
10,017,039 B1* 7/2018 Colavincenzo ....... B60W 10/06
(Continued)

FOREIGN PATENT DOCUMENTS

CN   104249736   12/2017
CN   110435655   11/2019
(Continued)

OTHER PUBLICATIONS

CN-110435655-A translation (Year: 2019).*
(Continued)

*Primary Examiner* — Kyle T Johnson
(74) *Attorney, Agent, or Firm* — Taft Stettinius & Hollierst LLP

(57) ABSTRACT

A method of controlling one or more vehicles of a platoon of vehicles includes determining in response to information of forward route conditions of the platoon an opportunity to mitigate braking losses, performing regenerative braking in response to a deceleration output of an cooperative adaptive cruise control (CACC) system, adjusting an inter-vehicle distance of the CACC system, and performing at least one of the regenerative braking and the adjusting the inter-vehicle distance.

26 Claims, 6 Drawing Sheets

(52) U.S. Cl.
CPC ... *B60W 30/18136* (2013.01); *B60W 2710/18* (2013.01); *B60W 2720/10* (2013.01); *B60W 2754/30* (2020.02)

(56) References Cited

U.S. PATENT DOCUMENTS

| | | | |
|---|---|---|---|
| 2018/0210461 A1* | 7/2018 | Cremona | G05D 1/0293 |
| 2019/0084534 A1* | 3/2019 | Kasper | B60R 16/0315 |
| 2019/0171226 A1* | 6/2019 | Kim | G08G 1/22 |
| 2020/0372805 A1 | 11/2020 | Kim | |
| 2021/0213948 A1* | 7/2021 | Lahti | B60W 30/162 |
| 2023/0382379 A1* | 11/2023 | Borhan | B60L 58/13 |
| 2024/0132071 A1* | 4/2024 | Fuhs | B60W 10/18 |

FOREIGN PATENT DOCUMENTS

| | | | | |
|---|---|---|---|---|
| CN | 110435655 A | * | 11/2019 | |
| CN | 115158307 B | * | 9/2024 | B60W 10/18 |
| GB | 2570898 | | 8/2019 | |
| KR | 20220001021 A | * | 1/2022 | B60W 30/165 |
| WO | 2019094538 | | 5/2019 | |
| WO | 2019133476 | | 7/2019 | |

OTHER PUBLICATIONS

CN-115158307-B translation (Year: 2024).*
Efficient Eco-Driving Control for EV Platoons in Mixed Urban Traffic Scenarios Considering Regenerative Braking2024 (Year: 2024).*
KR-20220001021-A translation (Year: 2022).*

* cited by examiner

COOPERATIVE ADAPTIVE CRUISE CONTROL FOR ELECTRIFIED POWERTRAIN VEHICLES

CROSS-REFERENCE

This application claims the benefit of and priority to U.S. Application No. 63/365,556 filed May 31, 2022, which is hereby incorporated by reference.

TECHNICAL FIELD

The present application relates generally to cooperative adaptive cruise control (CACC) for vehicles with electrified powertrains, for example, all-electric powertrains, hybrid combustion engine-electric powertrains, and fuel cell powertrains.

BACKGROUND

A number of proposals have been made for vehicle platooning. A number of proposals have been made for electrified powertrains. To some extent such proposals have overlapped, though largely implicitly. There remains a significant unmet need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

Example embodiment include unique cooperative adaptive cruise control (CACC) apparatuses, methods, systems, and techniques including for vehicles with electrified powertrains. Further embodiments, forms, objects, features, advantages, aspects, and benefits shall become apparent from the following description and drawings.

DETAILED DESCRIPTION OF EXAMPLE EMBODIMENTS

Figure 1:
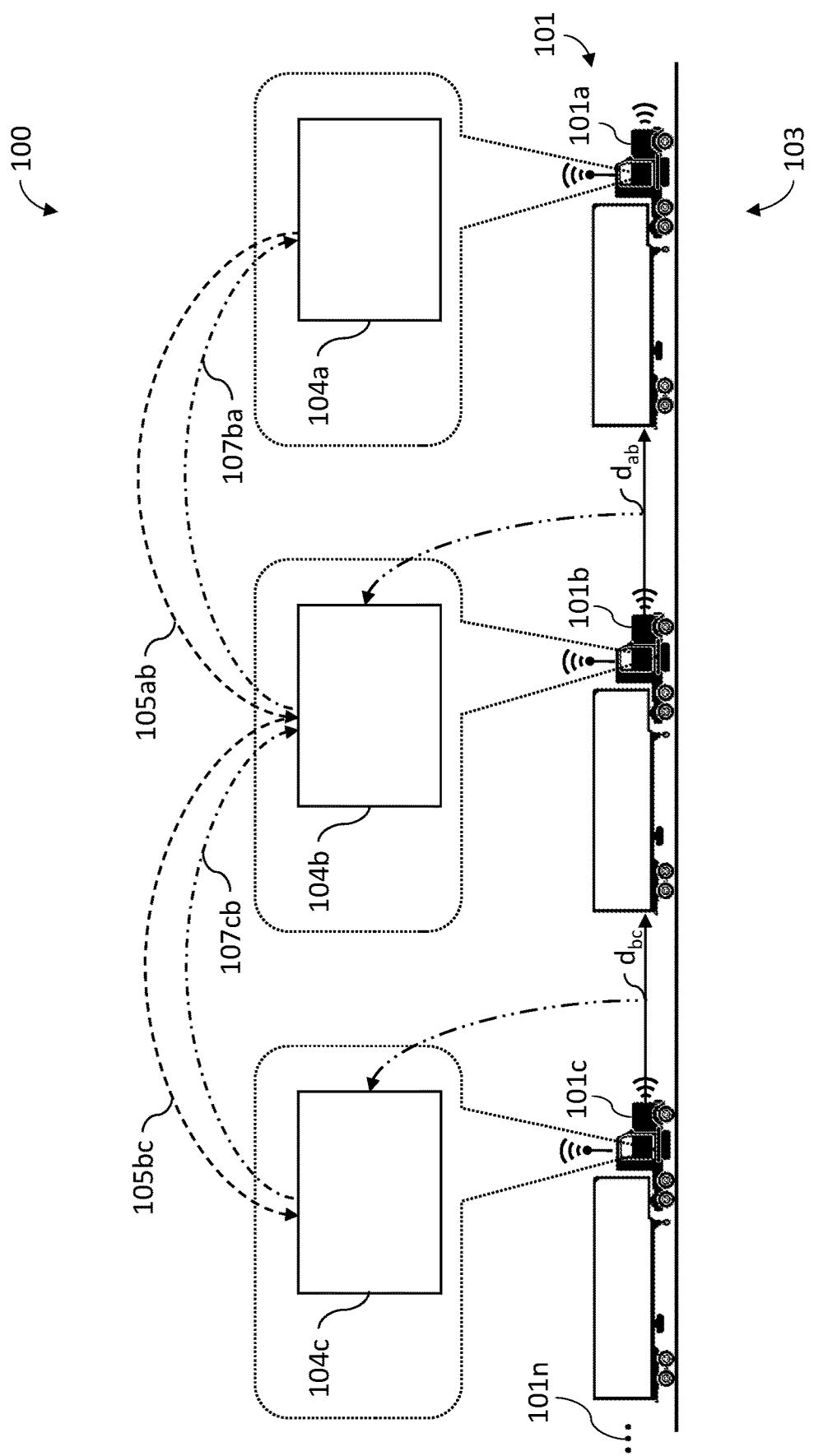
FIG. 1 is a schematic illustration of certain aspects of an example vehicle platoon control system.

With reference to FIG. 1, there is illustrated a schematic view of an example vehicle platoon 103 is illustrated in a platooning mode of operation in which the operation of vehicles 101 is controlled in a coordinated manner according to one or more of the apparatuses, methods, systems, and techniques disclosed herein. It shall be appreciated that the disclosed apparatuses, methods, systems, and techniques may be configured and operable to reduce net fuel consumption and increase net operating efficiency of the vehicle platoon 103.

In the illustrated example, vehicle platoon 103 is illustrated as including a plurality of vehicles 101a, 101b, 101c, and potentially additional vehicles 101n as indicated by an ellipsis. Vehicles 101a, 101b, 101c, and other vehicles 101n may be referred to individually as a vehicle 101 and collectively as vehicles 101 or collectively as vehicle platoon 103. It shall nevertheless be appreciated vehicle platoons according to the present disclosure may comprise any number of two or more vehicles traveling in proximity to one another such that information about characteristics, operation and/or performance of one or more of the vehicles can be obtained and processed to adjust or tune the power or performance characteristics of one or more of the vehicles in the platoon.

Each of vehicles 101 may be any of a variety of types of vehicles such as trucks, tractor-trailers, box trucks, buses, and passenger cars, among others. In the illustrated example, vehicles 101 are depicted as tractor-trailers, but other types of vehicles, such as the foregoing, are contemplated herein. Vehicles 101 may each be the same or similar types of vehicles, for example, in the case of a commonly managed vehicle fleet, or may be a heterogeneous group or set of vehicles which may comprise different types or classes of vehicles, for example, semi tractor-trailers and passenger cars. Regardless of the similarity of or differences between vehicles 101, the cargo load of vehicles 101 may vary among vehicles 101 at a given time and for each of vehicles 101 and among vehicles 101 over time.

Each vehicle 101 includes an electrified prime mover system (not visible in the illustrated view) structured to output power to propel the vehicle 101, such as an all-electric system, a hybrid combustion engine-electric system, a fuel cell-electric system, or a combination of the foregoing and/or other types of electrified prime mover systems as will occur to one of skill in the art with the benefit and insight of the present disclosure. Some embodiments contemplate that prime movers may each be the same or similar types of prime movers, for example, in the case of a commonly managed vehicle fleet. Some embodiments contemplate that prime movers may comprise different types or classes of prime movers, for example, prime movers of different sizes, powers or types. For convenience of description the electrified prime mover system may be referred to herein as a prime mover, it being appreciated that such references include and encompass the various embodiments herein described.

Each vehicle 101 utilizes one or more environmental sensors (not depicted in the view of FIG. 1) to determine its positioning relative to other vehicles in vehicle platoon 103. Examples of the types of sensor systems that may be utilized include RADAR systems, LIDAR systems, proximity sensor systems, camera systems, and combinations of these and/or other sensor systems. Each vehicle 101 in vehicle platoon 103 also includes a wireless communication system allowing vehicle-to-vehicle (V2V) communication or vehicle-to-X (V2X) communication where X denotes a variety of possible types of external networks including, for example, networks associated with stationary infrastructure assets.

Each vehicle 101 includes an electronic control system (ECS) (e.g., ECS 104a of vehicle 101a, ECS 104b of vehicle 101b, and ECS 104c of vehicle 101c) which is structured to control and monitor operation of its respective vehicle 101, as well as to participate in one or more of the coordinated operation as disclosed herein. An example ECS comprises one or more integrated circuit-based electronic control units (ECU) or other control components which may be operatively coupled to one another over a communication bus or network such as a controller area network (CAN) and which are structure to implement various controls, for example, an engine ECU structured to control and monitor operation of an engine and engine accessories, a transmission ECU structured to control and monitor operation of a transmission, a wireless communication ECU structured to control ex-vehicle wireless communications, and one or more environmental sensor ECUs structured to control operation of an environmental sensor system may be provided. It shall be appreciated that the control logic and control processes disclosed herein may be performed by controllers or controls which are implemented in dedicated control components of the ECS (e.g., in a dedicated ECU or other dedicated control circuitry) or may be implemented in a distributed fashion across multiple control components of ECS (e.g., through coordinated operation of an engine ECU, a transmission ECU, a wireless communication ECU and an environmental sensor ECU).

The ECUs and other control components of the ECS may comprise digital circuitry, analog circuitry, or hybrid combinations of both of these types. The ECUs and other control components of the ECS can be programmable, an integrated state machine, or a hybrid combination thereof. The ECUs and other control components of the ECS can include one or more Arithmetic Logic Units (ALUs), Central Processing Units (CPUs), memories, limiters, conditioners, filters, format converters, or the like which are not shown to preserve clarity. In one form, the ECS is of a programmable variety that executes algorithms and processes data in accordance with operating logic that is defined by executable program instructions stored in a non-transitory memory medium (e.g., software or firmware). Alternatively or additionally, operating logic for the ECS can be at least partially defined by hardwired logic or other hardware.

It shall be appreciated that electronic control systems and components thereof disclosed herein may be configured to determine or obtain a parameter, quantity, value or other operand based upon another parameter, quantity, value or other operand in a number of manners including, for example, by calculation, computation, estimation or approximation, look-up table operation, receiving a parameter, quantity, value or other operand from one or more other components or systems and storing such received parameter, quantity, value or other operand in a non-transitory memory medium associated with the electronic control systems or components thereof, other determination techniques or techniques of obtaining as would occur to one of skill in the art with the benefit of the present disclosure, or combinations thereof. Likewise the disclosed acts of determination or determining or obtaining a parameter, quantity, value or other operand based upon another parameter, quantity, value or other operand may comprise a number acts including, for example, acts of calculation, computation, estimation or approximation, look-up table operation, receiving a parameter, quantity, value or other operand from one or more other components or systems and storing such received parameter, quantity, value or other operand in a non-transitory memory medium associated with the electronic control systems or components thereof, other determination techniques or techniques of obtaining as would occur to one of skill in the art with the benefit of the present disclosure, or combinations thereof.

The environmental sensor and wireless communication capabilities of vehicles 101 allow their operation to be coordinated using direct or indirect communication. For example, vehicles 101 may accelerate or brake simultaneously, or in a coordinated sequence, maintain a particular distance relative to one another, or maintain a particular offset relative to one another. Coordinated operation also allows a closer following distance between vehicles by compensating for or eliminating distance needed for human reaction. Coordinate operation of vehicle platoon 103 further allows for operation that reduces net fuel consumption or increases net efficiency of the vehicle platoon 103. One or more of the vehicles 101 may in some embodiments, be equipped with aerodynamic capability (wind assist panels on cab & trailer, aerodynamic tractor body) that creates a laminar flow of air (tunnel effect) that greatly reduces air drag. Other vehicles among vehicles 101 may be spaced close enough to the vehicle taking advantage of a wind break tunnel to increase fuel economy. It shall be appreciated that the controls disclosed herein can mitigate aerodynamic losses both by adjusting vehicle following distance(s) and vehicle offset.

The respective ECS of each of vehicles 100 is configured and operable to send and received inter-vehicle transmissions in a bi-directional manner. In the illustrated example, ECS 104a of vehicle 101a sends a transmission 105ab which is received by ECS 104b of vehicle 101b, and ECS 104b of vehicle 101b sends a transmission 107ba which is received by ECS 104a of vehicle 101a. Likewise, ECS 104b of vehicle 101a sends a transmission 105bc which is received by ECS 104c of vehicle 101c, and ECS 104c of vehicle 101c sends a transmission 107cb which is received by ECS 104b of vehicle 101b. Similar bi-directional communication may occur relative to one or more other vehicles 101n of platoon 103. In the illustrated example, each of vehicles 101 is in bi-directional communication with its respective immediately forward vehicle (if present, e.g., in the case of a non-lead vehicle) and its respective immediately rearward vehicle (if present, e.g., in the case of a non-caboose vehicle). It is also contemplated that one or more of vehicles 101 may be in bi-directional communication with other forward vehicles (if present) and other rearward vehicles (if present).

Figure 2:
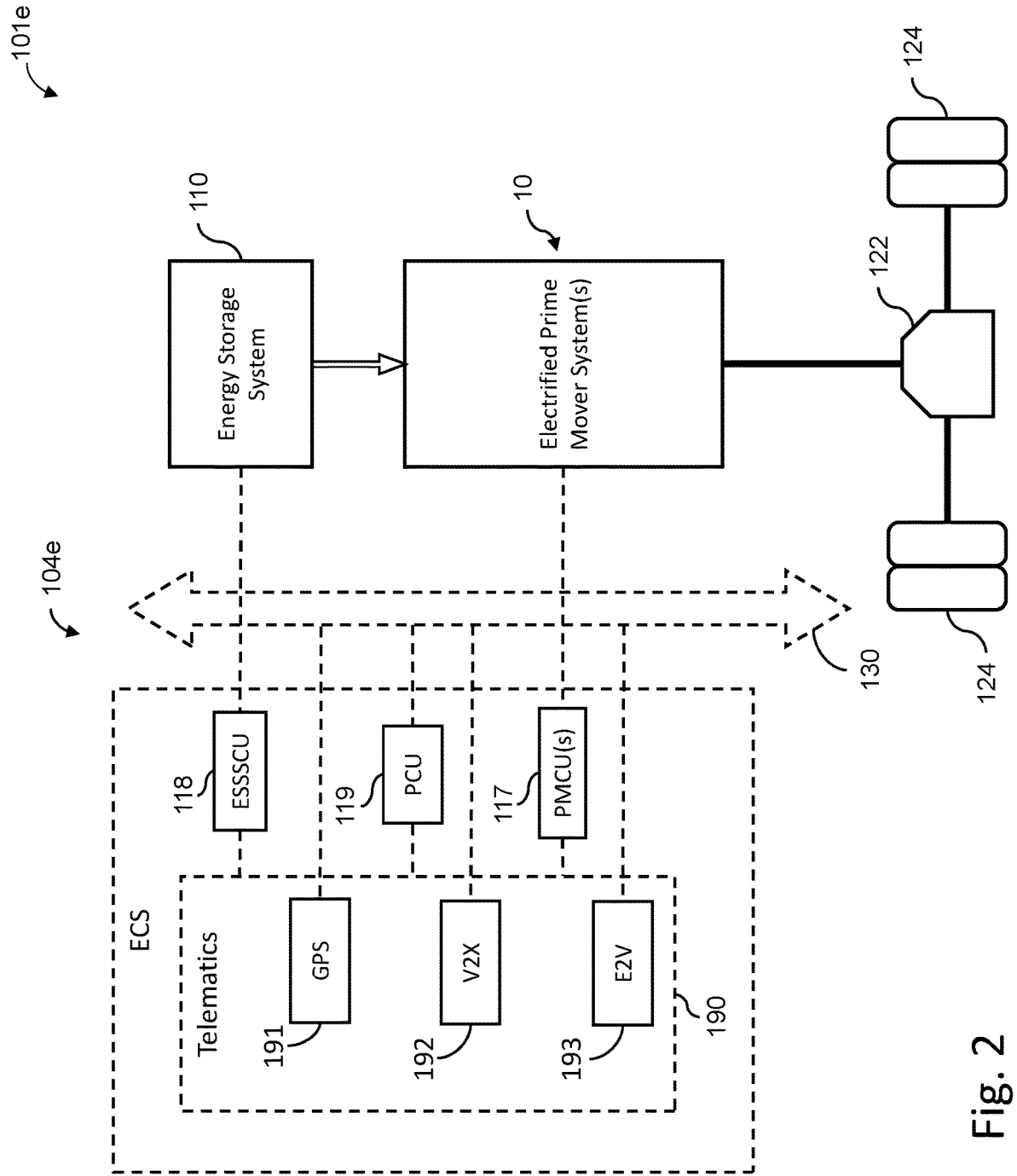
FIG. 2 is a schematic illustration of certain aspects of an example vehicle configured for platooning operation.

With reference to FIG. 2, there is illustrated an example vehicle system 101e (also referred to herein as system 101e) according to one example embodiment. System 102e is one example of a vehicle configuration that may be provided in any one or more of vehicles, 101a, 101b, 101c, 101n of vehicle platoon 103. Furthermore, system 102e includes an ECS 104e which is one example of an electronic control system configuration that may be provided in any one or more of vehicles, 101a, 101b, 101c, 101n of vehicle platoon 103. It shall be appreciated that in other embodiments, and forms, system 101e and ECS 104e may include additional or alternative features including, for example, the alternatives, options, and variations disclosed elsewhere herein.

System 101e includes an prime mover 10 including one or more systems providing an electrified prime mover for vehicle 101e. System 101e includes an energy storage system (ESS) 110 operationally coupled to the prime mover 10. ESS 110 may be provided in a number of forms, for example, one or more battery systems, super-capacitor systems, ultra-capacitor systems or other electrical or electrochemical energy storage systems as will occur to one of skill in the art with the benefit and insight of the present disclosure.

System 101e includes telematics system 190. In the illustrated example, telematics system 190 includes a global positioning system (GPS) receiver 191, a vehicle-to-everything (V2X) receiver 192, and one or more environment-to-vehicle (E2V) receivers 193. Other embodiments may include telematics systems that include only one of GPS receiver 191 and V2X receiver 192, or that include additional or alternative telematics devices and systems. GPS receiver 191 may be configured to receive satellite-based and/or terrestrial-based GPS signals. V2X receiver 192 may be configured to receive signals from terrestrial infrastructure, other vehicles, or other sources. V2X receiver 192 may be configured as a transceiver configured for two-way communication or may be paired with a separate V2X transmitter. The one or more environment-to-vehicle (E2V) receivers 193 may include, for example, RADAR devices or systems, LIDAR devices or systems, proximity sensor devices or systems, or camera and image processing devices or systems, or combinations thereof.

System 101e includes an electronic control system (ECS) 104e which includes control circuitry configured to control a number of operational aspects of system 101e. The control circuitry of ECS 104e may be provided in a number of forms and combinations. In some embodiments, the control circuitry of ECS 104e may be provided in whole or in part by one or more microprocessors, microcontrollers, other integrated circuits, or combinations thereof which are configured to execute instructions stored in a non-transitory memory medium, for example, in the form of stored firmware and/or stored software. It shall be appreciated microprocessor, microcontroller and other integrated circuit implementations of the control circuitry disclosed herein may comprise multiple instances of control circuitry which utilize common physical circuit elements. For example, first control circuitry may be provided by a combination of certain processor circuitry and first memory circuitry, and second control circuitry may be provided by a combination of, at least in part, that certain processor circuitry and second memory circuitry differing from the first memory circuitry.

It shall be further appreciated that the control circuitry of ECS 104e may additionally or alternatively comprise other digital circuitry, analog circuitry, hybrid analog-digital circuitry, or combinations thereof. Some non-limiting example elements of such circuitry include application specific integrated circuits (ASICs), arithmetic logic units (ALUs), amplifiers, analog calculating machine(s), analog to digital (A/D) and digital to analog (D/A) converters, clocks, communication ports, field programmable gate arrays (FPGAs), filters, format converters, modulators or demodulators, multiplexers, and de-multiplexers, non-transitory memory devices and media, oscillators, processors, processor cores, signal conditioners, state machine(s), and timers. As with microprocessor, microcontroller, and other integrated circuit implementations, such alternate or additional implementations may implement or utilize multiple instances of control circuitry which utilize common physical circuit elements. For example, first control circuitry may be provided by a combination of first control circuitry elements and second control circuitry elements, and second control circuitry may be provided by a combination of the first control circuitry elements and third control circuitry elements differing from the first control circuitry elements.

ECS 104e may be provided as a single component or physical unit or a collection of operatively coupled components or physical units. When of a multi-component or multi-unit form, ECS 104e may have one or more components remotely located relative to the others in a distributed arrangement and may distribute the control function across one or more control units or devices. In the illustrated example, ECS 104e includes multiple electronic control units including prime mover control unit(s) (PMCU(s)) 117, energy storage/supply system control unit (ESSCU) 118, and platooning control unit (PCU 119). In general, PMCU(s) 117, ESSCY 118, and PCU 119 are configured to respectively control prime mover 10, ESS 110, and telematics system 190, and are also configured to operatively communicate with one another either directly or via one or more networks 130 such as one or more controller area networks (CANs) and may also be configured to communicate with various systems, devices, and sensors of system 101e via dedicated communication links of via one or more CANs. Example communication connections are illustrated in FIG. 2, although in any given embodiment connections illustrated may not be present, and/or additional connections may be present.

Figure 3A:
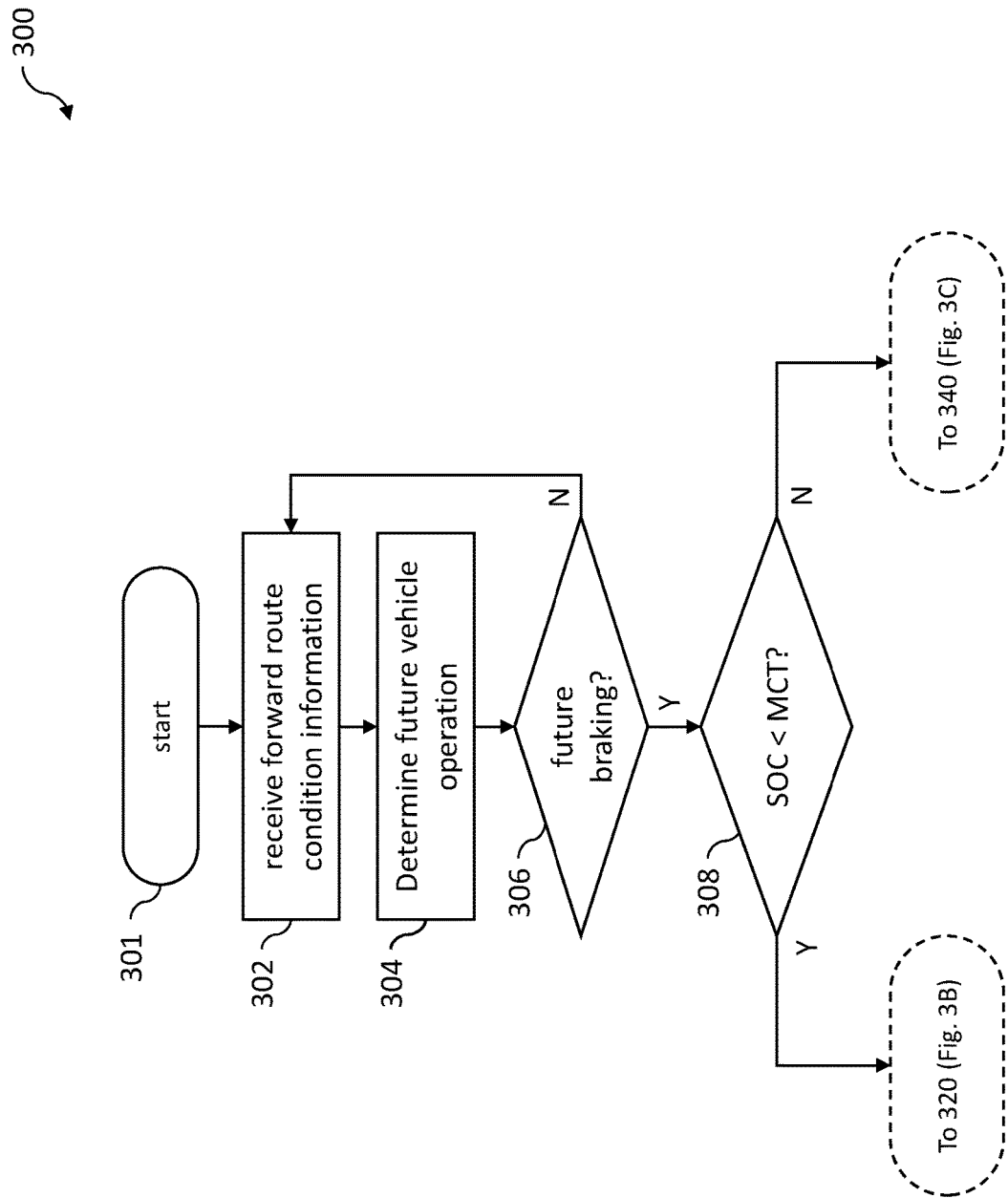
FIGS. 3A, 3B, and 3C are flow diagrams depicting certain aspects of example control processes which may be utilized in controlling one or more vehicles of a vehicle platoon.
Figure 3B:
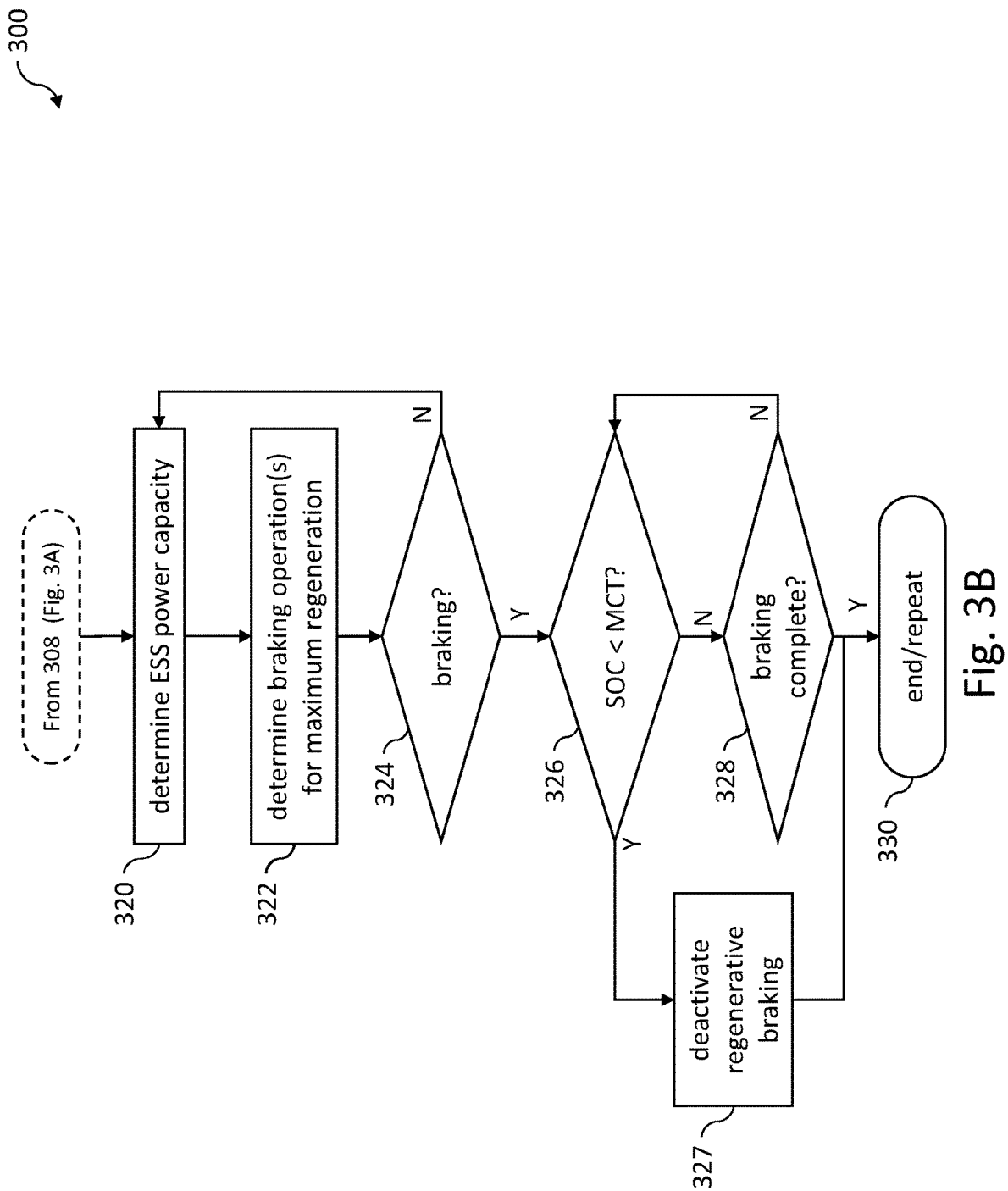
Figure 3C:
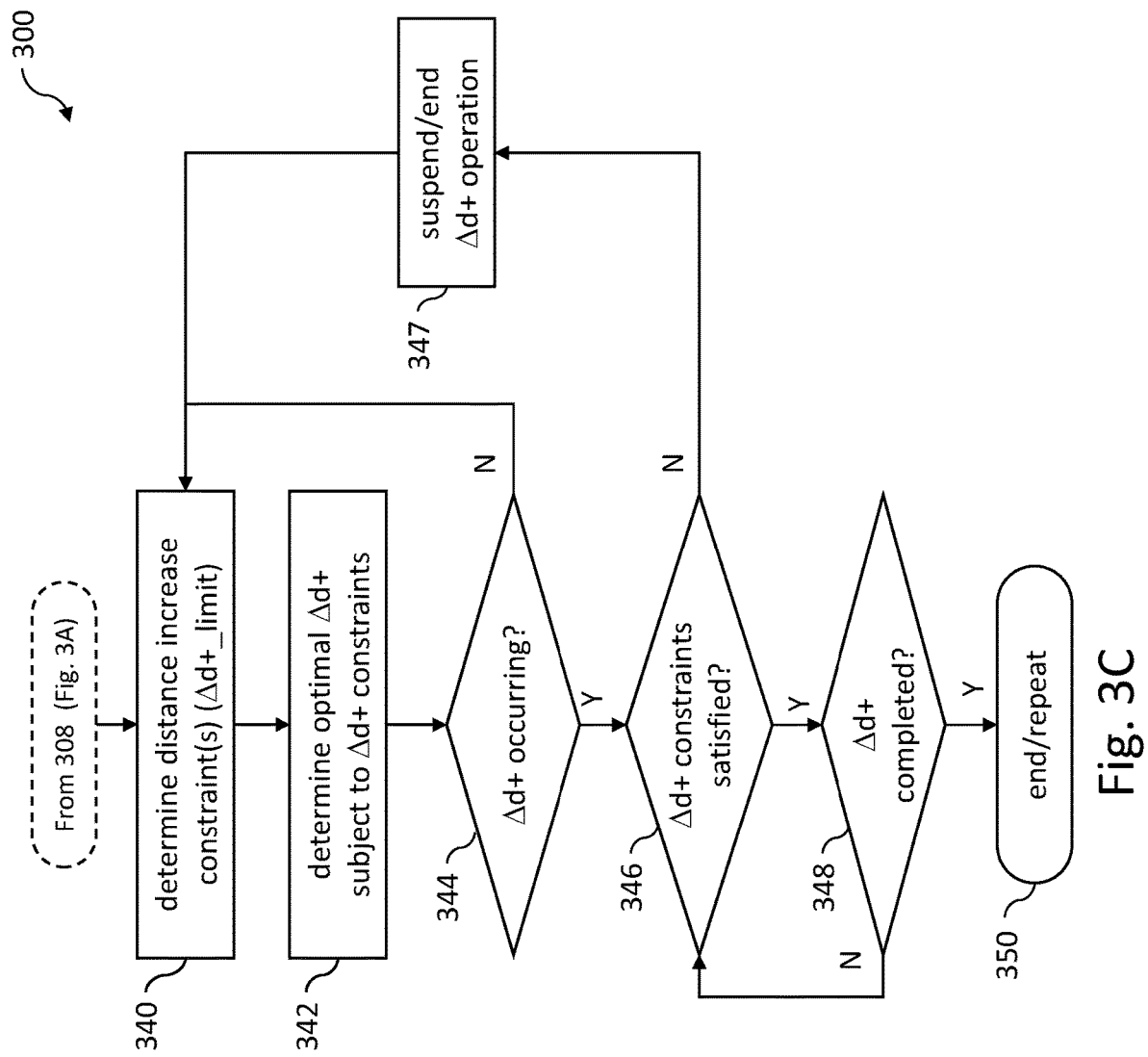

With reference to FIGS. 3A, 3B, and 3C, there is illustrated an example process 300 which may be implemented or provided in and/or executed or performed by one or more components of an electronic control system of a vehicle, such as ECS 104e of vehicle 101e which, as noted above, provides one example of an ECS that may be implemented in one or more vehicles of a vehicle platoon such as vehicle 101a, 101b, 101c, 101n of vehicle platoon 103 or other vehicles of other vehicle platoons.

Process 300 begins at start operation 301 and proceeds to operation 302 which receives forward route condition information. The forward route condition information may include one or more look-ahead parameters which may be received, for example, by or via one or more components or elements of a telematics system, such as telematics system 190, such as a vehicle-to-X (V2X) communication system and/or a GPS system which receive respective wireless transmission initiated or sent from a satellite or terrestrial (fixed or mobile) transmission source. The look ahead parameters may include any of the look-ahead parameters disclosed herein including, for example, future or upcoming road grade, road direction or curvature, altitude, wind speed and direction, precipitation information, traffic flow information, and speed limit information, as well as a number of other a parameters as will occur to one of skill in the art with the benefit and insight of the present disclosure From operation 302, process 300 proceeds operation 304 which predicts future vehicle operation. The prediction of future vehicle operation at operation 304 may utilize one or more controllers configured according to any of a number of implementations and topologies. The one or more controllers may be configured to predict one or more future operational states of one or more vehicles of a platoon, for example, one or more future position, velocities, and accelerations, and/or one or more future vehicle systems states, for example, acceleration operations (e.g., powertrain torque, power, speed, or other powertrain outputs) or deceleration operations (e.g., braking outputs, or powertrain torque, power, speed, or other powertrain outputs). The one or more future operational states may be predicted for a given vehicle (referred to herein as vehicle k), one or more vehicles forward of vehicle k (referred to herein as vehicle k−1 to denote the vehicle immediately forward of vehicle k, or as vehicle k−n, where n>=1 to denote any various vehicle positions forward of vehicle k), and/or one or more vehicles rearward of vehicle k (referred to herein as vehicle k+1 to denote the vehicle immediately rearward of vehicle k, or as vehicle k+n, where n<=1 to denote any various vehicle positions rearward of vehicle k). In some embodiments, the one or more controllers may be configured and provided as one or more model predictive controller (MPC), for example, linear, piecewise linear, non-linear, hybrid, adaptive, stochastic, machine learning-based MPC implementations and topologies.

From operation 304, process 300 proceeds to conditional 306 which evaluates whether future braking is predicted. Conditional 306 may evaluates whether future braking is predicted in response to or using the predicted future vehicle operation parameters of operation 304. If conditional 306 evaluates negative, process 300 proceeds to operation 302. If conditional 306 evaluates affirmative, process 300 proceeds to conditional 308.

Conditional 308 evaluates whether a state of charge (SOC) which may be may be indicative of amount of charge present in an energy storage system such as ESS 110, or another ESS. If conditional 308 evaluates affirmative, process 300 proceeds to operation 320. If conditional 308 evaluates negative, process 300 proceeds to operation 340.

In some embodiments process 300 may additionally or alternatively consider or evaluate the battery state of health (SOH) or a battery state of power (SOP) as a limit on regenerative braking based on changes in battery charge/discharge capacity, changes in battery internal resistance, and/or battery temperature during charging/discharging. In response to an evaluation of SOH and/or SOP, the minimum safe following distance may be varied. For example, where the evaluation of SOH and/or SOP indicates that a rate of power output from regenerative braking exceeds a charging capacity of the battery, the minimum following distance may be increased to allow for longer breaking operation (limited by the reduced charging rate of the battery) to avoid the necessity of using service brakes or other braking events resulting in losses. Such an evaluation may be utilized to temporarily increase distance to derate charging for a vehicle system with an aged battery until such time as the battery is replaced.

Operation 320 determines and energy storage system (ESS) power capacity which may be indicative of an amount of power or charge that can be received by an ESS, such as ESS 110, before the ESS is fully charged or charged to a maximum capacity. From operation 320, process 300 proceeds to operation 322.

Operation 322 determines one or braking operations for maximum regeneration. Operation 322 may be configured to determine one or more braking operations to maximize regenerative braking among a plurality of braking operations. The plurality of braking operations may include, for example, regenerative braking, of operating a service brake, operating an engine brake, operating a transmission brake, or combinations thereof. In some embodiments, operation 322 may determine an amount of regenerative braking that can be performed within the ESS) power capacity of operation 320 relative to the amount of braking needed to achieve a predicted future vehicle operation such as a deceleration or braking operation determined by or from output of operation 304. If the regenerative braking is sufficient to achieve the predicted future vehicle operation, regenerative braking alone may be utilized. If the regenerative braking is insufficient to achieve the predicted future vehicle operation, regenerative braking may be used in combination with one or more other braking operations such as those disclosed herein. Similar determinations may be made relative to the combinations with one or more other braking operations, for example, by first evaluating a combination of regenerative braking and engine braking, then additionally or alternatively evaluating a combination of regenerative braking and transmission braking, and then additionally or alternatively evaluating a combination of regenerative braking and service braking.

From operation 322, process 300 proceeds to conditional 324 which evaluates whether a braking operation is occurring. If conditional 324 evaluates negative, process 300 proceeds to operation 320. If conditional 324 evaluates affirmative, process 300 seats to conditional 326.

Conditional 326 evaluates whether an ESS state of charge parameter is less than the maximum charge threshold. If conditional 326 evaluates affirmative, process 300 proceeds to operation 327 which deactivates regenerative braking. From operation 327, process 300 proceeds to operation 330 and may end or repeat.

If conditional 326 evaluates negative, process 300 proceeds to conditional 328 which evaluates whether a braking operation has been completed. If conditional 328 evaluates negative, process 300 proceeds to conditional 326. If conditional 328 evaluates affirmative, process 300 proceeds operation 330 and may end or repeat.

Operation 340 determines distance increase constraint, for example, by calculating or reading from memory one or more distance increase constraint parameters ($\Delta d+$_limit). The one or more distance increase constraint parameters ($\Delta d+$_limit) may be determined or selected to as maximum distance that will allow continuation of platooning operation, or a maximum limit on inter-vehicle distance to minimize or mitigate cut-in events where non-platooning vehicles intervene between platooning vehicles. From operation 340, process 300 proceeds to operation 342 which determines an optimal distance increase ($\Delta d+$) subject to the distance increase constraint ($\Delta d+$_limit).

From operation 342, process 300 proceeds to conditional 344 which evaluates whether a distance increase operation is occurring. If conditional 344 evaluates negative, process 300 proceeds to operation 340. If conditional 344 evaluates affirmative, process 300 proceeds to conditional 346.

Conditional 346 evaluates whether the one or more distance increase constraints ($\Delta d+$_limit) is or are satisfied. If conditional 346 evaluates negative, process 300 proceeds to operation 347 which suspends and/or ends the distance increase operation. From operation 347, process 300 proceeds to operation 340.

If conditional 346 evaluates affirmative, process 300 proceeds to conditional 348 which evaluates whether the distance change operation has completed. If conditional 348 evaluates negative, process 300 proceeds to conditional 346. If conditional 348 evaluates affirmative, process 300 proceeds to operation 350 and may end or repeat.

Figure 4:
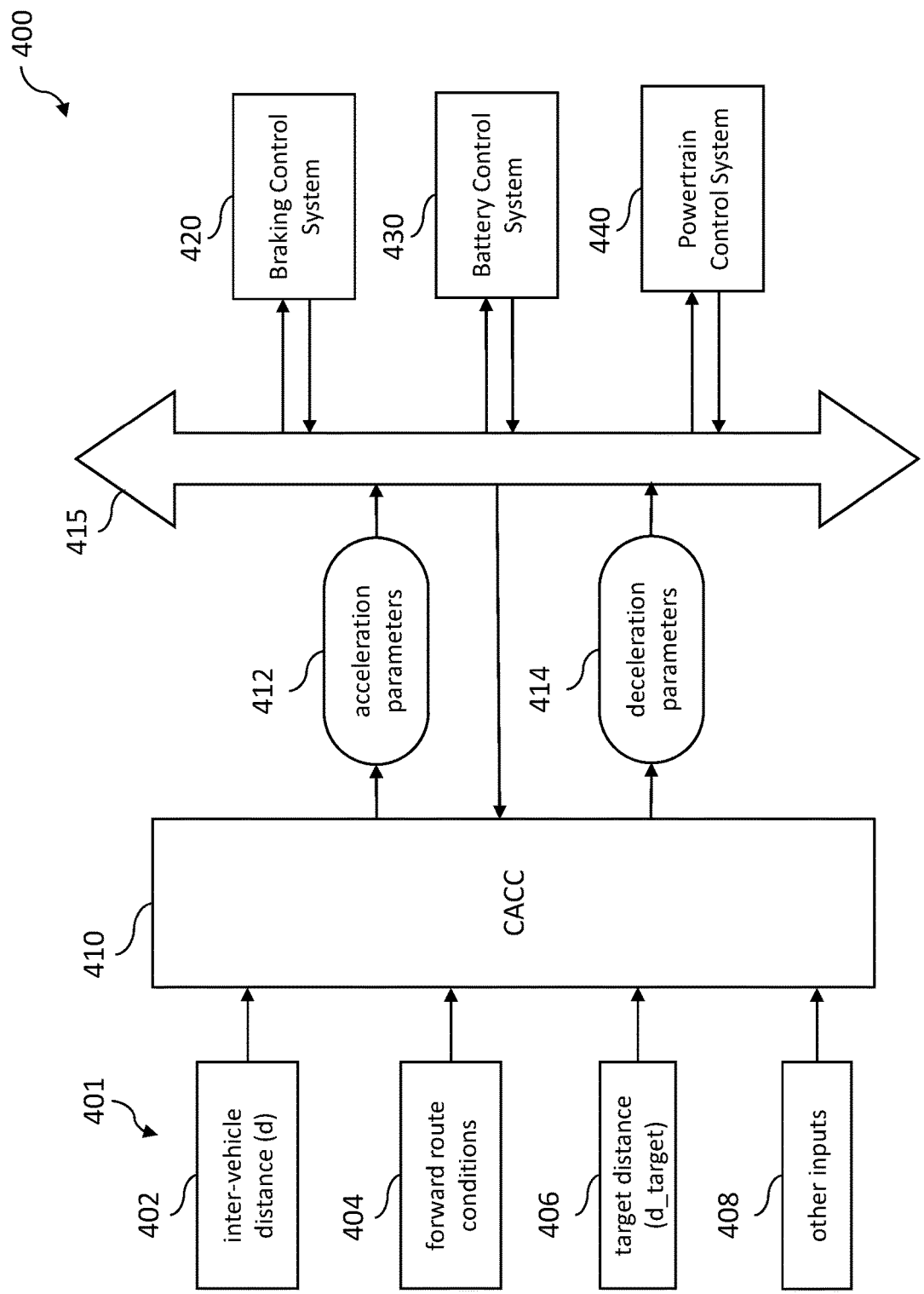
FIG. 4 is a schematic diagram depicting certain aspects of an example controls which may be utilized in controlling one or more vehicles of a vehicle platoon.

With reference to FIG. 4, there are illustrated example controls 400 which may be implemented or provided in and/or operated by one or more components of an electronic control system of a vehicle, such as ECS 104e of vehicle 101e which, as noted above, provides one example of an ECS that may be implemented in one or more vehicles of a vehicle platoon such as vehicle 101a, 101b, 101c, 101n of vehicle platoon 103 or other vehicles of other vehicle platoons, and which may execute or perform a control process such as control process 300 or various other control processes as will occur to one of skill in the art with the benefit and insight of the present disclosure. It shall be appreciated that controls 400 are structural in nature in that they describe one or both of physical components and the configuration of physical components, such as code, data structures, executables, or instructions stored in non-transitory memory media.

Controls 400 include a cooperative adaptive cruise control (CACC) controller 410 (also referred to herein as controller 410). Controller 410 receives a plurality of inputs 401. In the illustrated example, the plurality of inputs 401 include one or more inter-vehicle distance (d) parameters 402, one or more forward route condition parameters 404, and one or more target distance (d_target) parameters 406, and may further include one or more other inputs as will occur to one of skill in the art with the benefit and insight of the present disclosure.

The one or more inter-vehicle distance (d) parameters 402 may be received as or determined from output of a telematics system such as telematics system 190 any may utilize information received using one or more of the components thereof, for example, GPS receiver 191, V2X receiver 192, and/or E2V receiver 193. The one or more forward route condition parameters 404 may be established or set according to a prediction of future vehicle operation such as performed by operation 304 of process 300 or another operation of another process. The one or more target distance (d_target) parameters 406 may be set according to optimal distance increase (Δd+) parameter such as performed by operation 342 of process 300 or another operation of another process and/or may be set to a default or initial vale by a vehicle driver.

Controller 410 may, in response to the plurality of inputs 401, determine and provide as output one or more acceleration parameters 412 and/or one or more deceleration parameters 414. The one or more acceleration parameters 412 may include, for example, one or more powertrain output commands, control parameters, or targets (e.g., powertrain torque, speed, power, and/or other output commands, control parameters, or targets). The one or more deceleration parameters 414 may include, for example, one or more braking system commands, control parameters, or targets (e.g., commands, control parameters, or targets for regenerative braking, service braking, engine braking, transmission braking or other deceleration commands, control parameters, or targets).

The one or more acceleration parameters 412 and/or the one or more deceleration parameters 414 may be output and communicated to one or more communication networks or channels 415 which may be configured as or may include a controller area network (CAN) or other types of communication networks or channels as will occur to one of skill in the art with the benefit and insight of the present disclosure.

The one or more acceleration parameters 412 and/or the one or more deceleration parameters 414 may be communicated to and received by one or more controllers which may be in operative communication with communication networks or channels 415. In the illustrated example, such controllers include braking control system controller(s) 420, battery control system controller(s) 430 which may additionally or alternatively be provided as another type of energy storage system (ESS) controller(s), and powertrain control system controllers 440 which may include, for example, engine controllers, transmission controllers, motor controllers, fuel cell system controllers, and power electronics controllers, among other types of powertrain controls system controllers as will occur to one of skill in the art with the benefit and insight of the present disclosure.

The braking control system controller(s) 420, battery control system controller(s) 430, and/or powertrain control system controllers 440 may be configured to control their respective systems in response to the or more acceleration parameters 412 and/or the one or more deceleration parameters 414 including, for example, in accordance with the operations of a control process such as control process 300 or other control processes as will occur to one of skill in the art with the benefit and insight of the present disclosure.

It shall be appreciated that terms such as "a non-transitory memory," "a non-transitory memory medium," and "a non-transitory memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

It shall be appreciated that terms such as "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal (e.g., a voltage, frequency, current, or pulse-width modulation (PWM) signal) indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method of controlling one or more vehicles of a platoon of vehicles, the method comprising:
   determining in response to information of forward route conditions of the platoon an opportunity to mitigate braking losses of at least one vehicle of the platoon by performing regenerative braking in response to a deceleration output of a cruise control system, and adjusting an inter-vehicle distance of the cruise control system; and performing the regenerative braking and the adjusting the inter-vehicle distance;

wherein the determining the opportunity to mitigate braking losses includes iteratively evaluating a braking loss mitigation from the performing regenerative braking and the adjusting the inter-vehicle distance.

2. The method of claim 1, wherein the performing regenerative braking comprises determining an energy storage system (ESS) power capacity, and determining one or more braking operations in response to the ESS power capacity.

3. The method of claim 2, wherein the one or more braking operations are determined to maximize regenerative braking among a plurality of braking operations.

4. The method of claim 3, wherein the plurality of braking operations include one or more of operating a service brake, operating an engine brake, and operating a transmission brake.

5. The method of claim 1, wherein the determining comprises the adjusting the inter-vehicle distance of the cruise control system.

6. The method of claim 5, wherein the adjusting the inter-vehicle distance comprises determining an inter-vehicle distance increase subject to one or more constraints on inter-vehicle distance.

7. The method of claim 6, wherein the inter-vehicle distance increase is determined to mitigate a braking loss relative to a predicted vehicle braking at a current inter-vehicle distance.

8. The method of claim 6, wherein the one or more constraints on inter-vehicle distance include a maximum inter-vehicle distance.

9. The method of claim 1, comprising determining in response to second information of forward route conditions of the platoon a second opportunity to mitigate braking losses of at least one vehicle of the platoon by performing regenerative braking in response to a deceleration output of a cruise control system.

10. The method of claim 9, comprising performing the second regenerative braking.

11. A system for controlling one or more vehicles of a platoon of vehicles, the system comprising:

a communicative adaptive cruise control system including one or more processors configured to execute instructions stored on one or more non-transitory computer readable memory media to:

receive information of forward route conditions of the platoon, determine in response to the information of forward route conditions an opportunity to mitigate braking losses of at least one vehicle of the platoon by regenerative braking and adjustment of an inter-vehicle distance of the platoon of vehicles, and perform the regenerative braking and the adjusting the inter-vehicle distance, and iteratively evaluate a braking loss mitigation from the performing the regenerative braking and the adjustment of the inter-vehicle distance.

12. The system of claim 11, wherein the regenerative braking operation is based upon an energy storage system (ESS) power capacity.

13. The system of claim 12, wherein the regenerative braking operation is determined to maximize regenerative braking among a plurality of braking operations.

14. The system of claim 13, wherein the plurality of braking operations include one or more of operating a service brake, operating an engine brake, and operating a transmission brake.

15. The system of claim 11, wherein the one or more processors are configured to execute instructions stored on one or more non-transitory computer readable memory media to perform adjustment of the inter-vehicle distance.

16. The system of claim 15, wherein the adjustment of the inter-vehicle distance is subject to one or more constraints on inter-vehicle distance.

17. The system of claim 16, wherein the inter-vehicle distance increase is determined to mitigate a braking loss relative to a predicted vehicle braking at a current inter-vehicle distance.

18. The system of claim 16, wherein the one or more constraints on inter-vehicle distance include a maximum inter-vehicle distance.

19. The system of claim 11, wherein the one or more processors are configured to execute second instructions stored on one or more non-transitory computer readable memory media to second determine in response to second information of forward route conditions an opportunity to mitigate braking losses of at least one vehicle of the platoon by second regenerative braking.

20. The system of claim 19, wherein the second instructions further comprise instructions to perform the second regenerative braking.

21. An apparatus for controlling one or more vehicles of a platoon of vehicles, the apparatus comprising:

one or more non-transitory computer readable memory media configured with instructions executable by one or more processors to perform a plurality of acts, including:

receiving information of forward route conditions of the platoon, determining in response to the information of forward route conditions an opportunity to mitigate braking losses of at least one vehicle of the platoon by regenerative braking and adjustment an inter-vehicle distance of the platoon of vehicles, performing the regenerative braking and the adjusting the inter-vehicle distance, and iteratively evaluating a braking loss mitigation from the performing regenerative braking and the adjustment of the inter-vehicle distance.

22. The apparatus of claim 21, wherein the adjustment of the inter-vehicle distance is subject to one or more constraints on inter-vehicle distance.

23. The apparatus of claim 22, wherein the inter-vehicle distance increase is determined to mitigate a braking loss relative to a predicted vehicle braking at a current inter-vehicle distance.

24. The apparatus of claim 22, wherein the one or more constraints on inter-vehicle distance include a maximum inter-vehicle distance.

25. The apparatus of claim 21, wherein the plurality of acts further include second determining in response to second information of forward route conditions a second opportunity to mitigate braking losses of at least one vehicle of the platoon by second regenerative braking.

26. The apparatus of claim 21, wherein the plurality of acts further include performing a second regenerative braking.

* * * * *